United States Patent [19]

Osada

[11] 4,197,424

[45] Apr. 8, 1980

[54] STANDARD TIME SIGNAL GENERATOR IMMUNE TO NOISE INDUCED FALSE LOCKING

[75] Inventor: Mitsuhiro Osada, Machida, Japan

[73] Assignee: Echo Keisokuki Kabushiki Kaisha, Tokyo, Japan

[21] Appl. No.: 866,752

[22] Filed: Jan. 3, 1978

[30] Foreign Application Priority Data

Jan. 31, 1977 [JP] Japan .................................. 52-9420

[51] Int. Cl.[2] ............................................. H04L 7/00

[52] U.S. Cl. .................................... 375/106; 328/120

[58] Field of Search ............... 178/69.1; 325/323, 325, 325/64, 65, 473, 476; 343/225; 358/120; 58/24 R; 328/63, 72, 155, 110, 120; 307/219; 179/156 S

[56] References Cited

U.S. PATENT DOCUMENTS

| | | | |
|---|---|---|---|
| 3,386,079 | 5/1968 | Wiggins | 340/146.1 |
| 3,938,082 | 2/1976 | Schowe, Jr. | 340/146.1 D |

*Primary Examiner*—Benedict V. Safourek
*Assistant Examiner*—Peter Durigon
*Attorney, Agent, or Firm*—Spencer & Kaye

[57] ABSTRACT

A standard time signal generator generates a standard time signal based on Second signals included in a standard wave broadcast by a transmitting station such as JJY in Japan. A pulse train of the standard wave received through a receiver is selected according to a specific condition, and compared with a reference pulse train. When time coincidence therebetween reaches a specific value, a standard time signal is generated which corresponds to the Second signals of the standard wave.

8 Claims, 5 Drawing Figures

STANDARD TIME SIGNAL GENERATOR IMMUNE TO NOISE INDUCED FALSE LOCKING

BACKGROUND OF THE INVENTION

Figure 1:
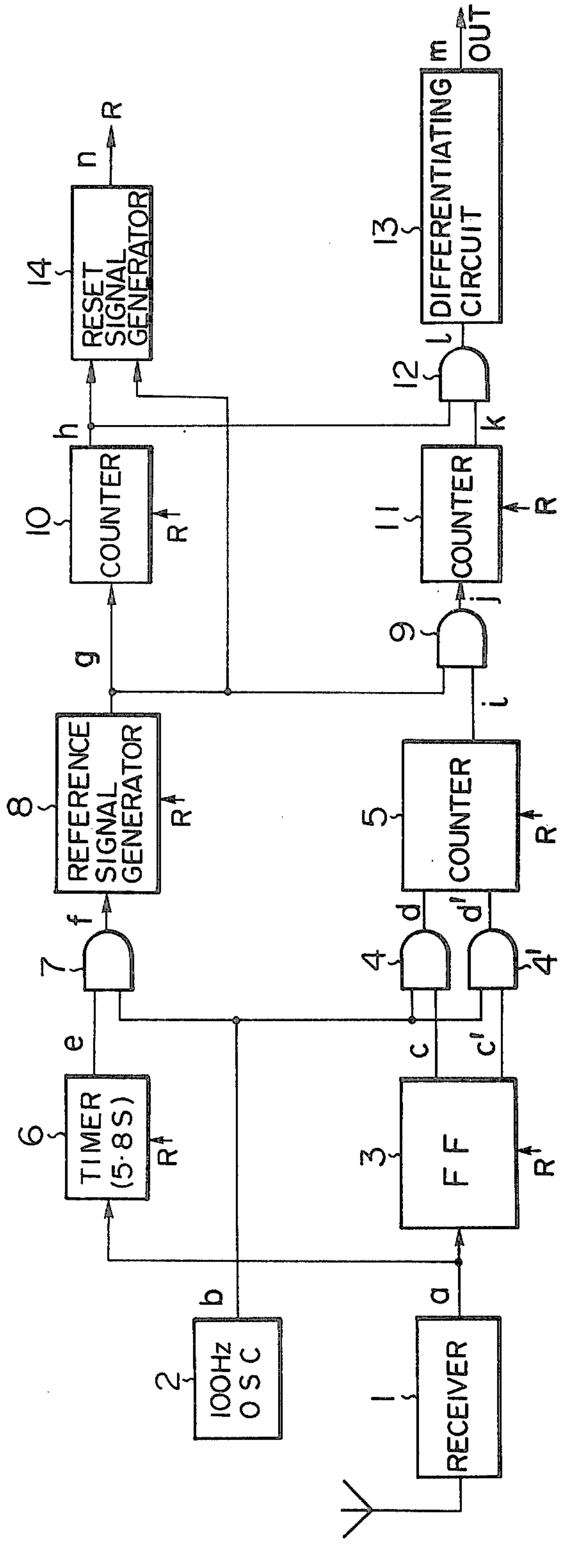

This invention relates to a circuit for receiving a standard time signal and producing standard time pulses.

Standard time broadcasting stations are used in many countries to provide accurate timing signals. For example, station JJY in Japan employs carrier frequencies of 2500 KHz, 5000 KHz, 10,000 KHz and 15,000 KHz and also generates a pulse train (called a Second signal) wherein the interval between pulses is precisely one second. The Second signal is modulated at 1600 Hz. If this pulse train of one second duration is precisely reproduced it may be utilized to correct the time displayed by a clock, etc. However, in the cities there are many disturbing radio wave sources and also the propagation of short waves is much affected by the time of day, weather, etc. Therefore the signal is not necessarily received at all times. In particular, in the former case, the time signal is apt to be confused with extraneous noise components and in this case the noise might be received as time signals. In the latter case, if the radio wave is weak, its S/N ratio is small and therefore is apt to be affected by noise. It is difficult in these cases to receive and use all of the standard time signals in order to drive a clock or to correct the time thereof.

If the operator of a receiver can select a special time during the day when such noise is relatively low, good reproduction may be possible. But, it is in fact impossible to reproduce a correct time signal automatically and constantly.

However, an erroneous output may be avoided if an output signal is generated only when a true JJY signal is received and conversely, if such a signal is not generated when receiving conditions are not satisfactory. With this method, an output signal may not be generated for a relatively long time. Nevertheless, in correcting the time of a clock having a monthly error within several seconds, such correction is possible if a correction signal is generated only once a day. It is apparent that this correction method is far better, then permitting an erroneous correction by an erroneous signal.

Therefore, it is an object of the present invention to provide a standard time signal generator which generates an output only when it is confirmed that a received signal is derived from the standard time wave.

In order to achieve this object, the standard time signal generator according to this invention is constructed to select a pulse train of a standard wave receiver output according to a specific condition, to compare the selected pulse train with a reference pulse train, and if the result of the comparison satisfies another specific condition, to generate an output signal on the basis of the time of the first pulse of the pulse train of the receiver output, considering that this first pulse is a signal from the standard wave.

The standard time signal generator according to this invention therefore comprises a receiver tuned to a standard time signal carrier to reproduce a time signal pulse train; a reference time pulse generator to generate a reference time pulse train when a first pulse is generated from the receiver, the duration of the reference time pulse being identical to that of the time signal pulse train; a replaced pulse generator to generate a pulse only when a next pulse is not generated from the receiver in a predetermined time interval after generation of the first pulse from the receiver and to generate a replaced time pulse train which corresponds to the time signal pulse; a coincident counter to count time coincidence between the reference pulse and the replaced time pulse from the replaced pulse generator and an output pulse generator which generates a pulse when the number of the coincident counter reaches a predetermined value within a limited time interval.

The standard time signal generator of this invention therefore does not generate a signal when the receiving condition is not in order. Thus, correction of a clock by an erroneous signal may be avoided completely. Further, in view of the relatively simple construction of it, the circuit may be provided in integrated form, and mounted in household digital clocks for time correction. Of course, the circuit of this invention may be used for any other clocks of higher class.

Figure 2:
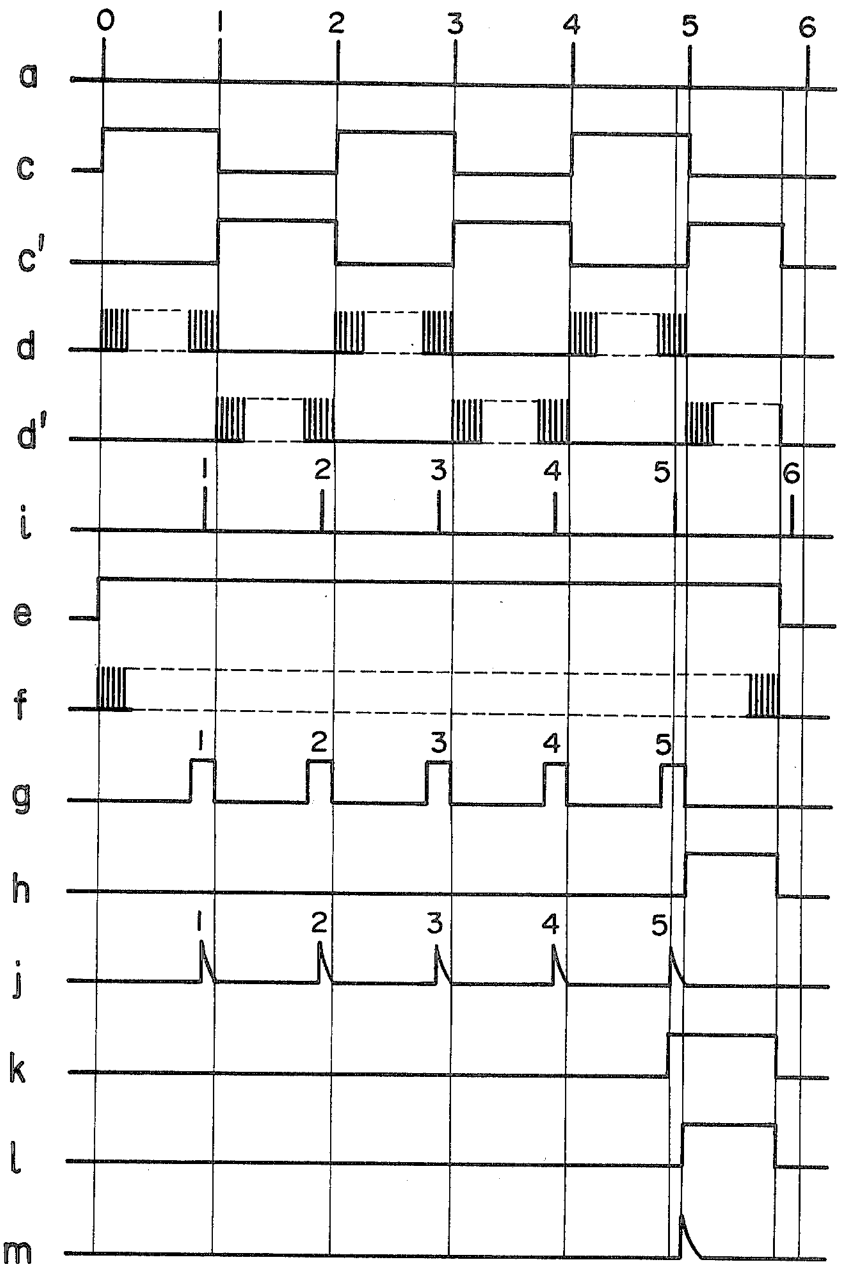
Figure 3:
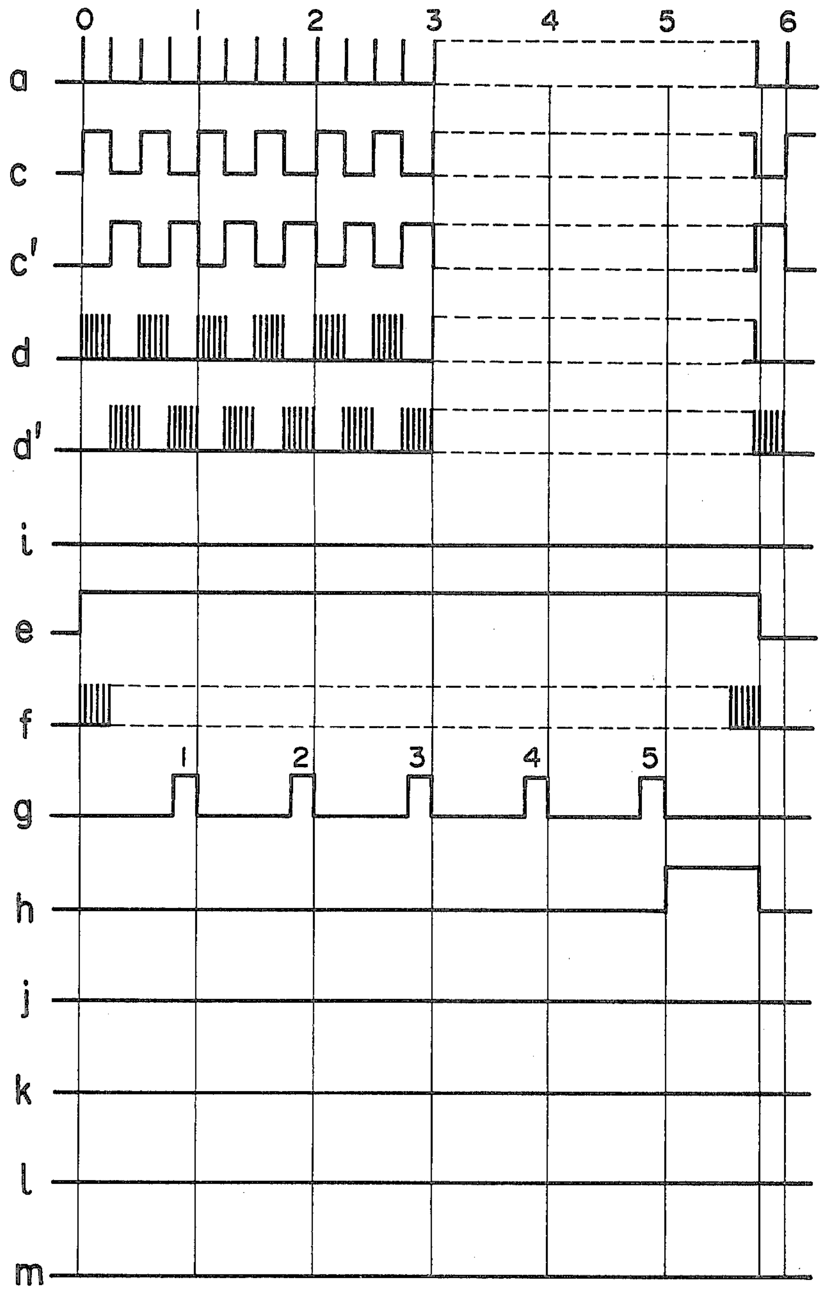
Figure 4:
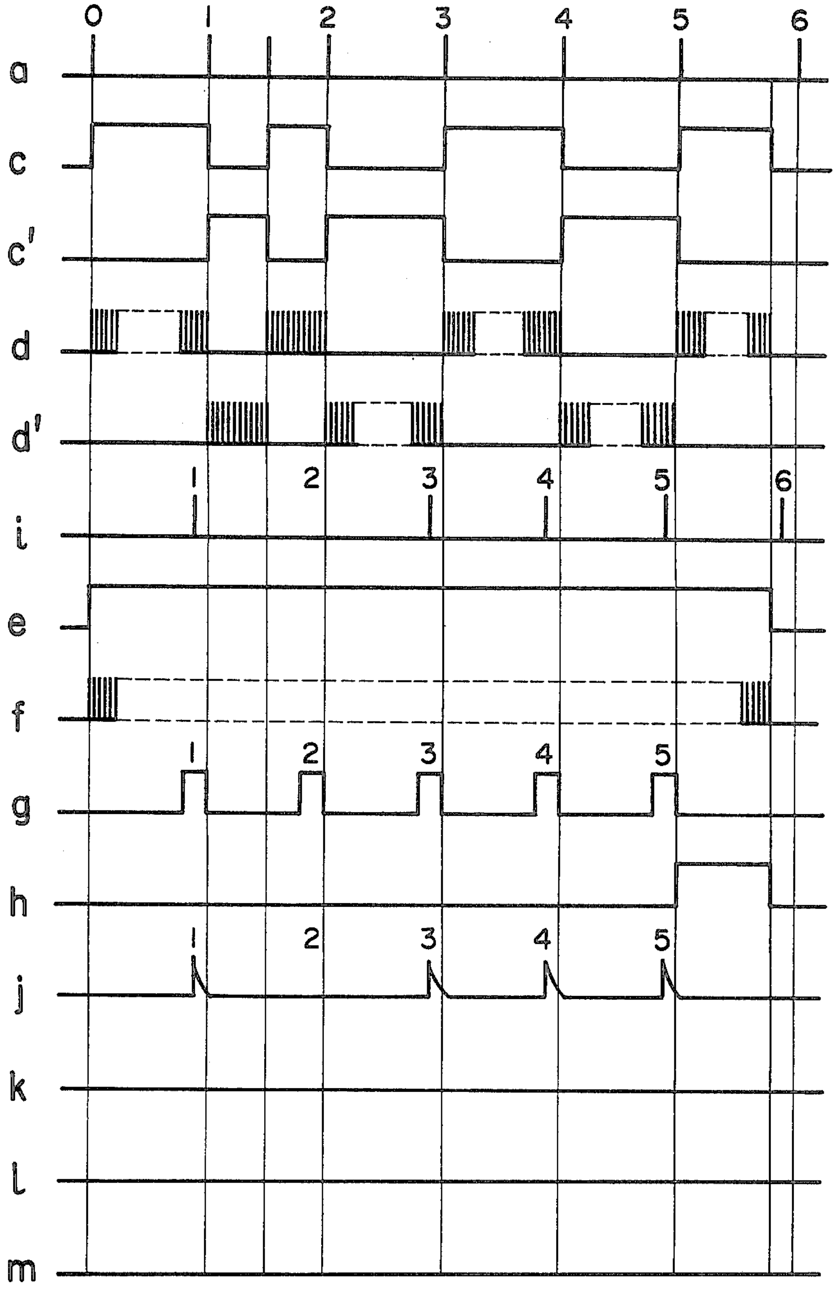
Figure 5:
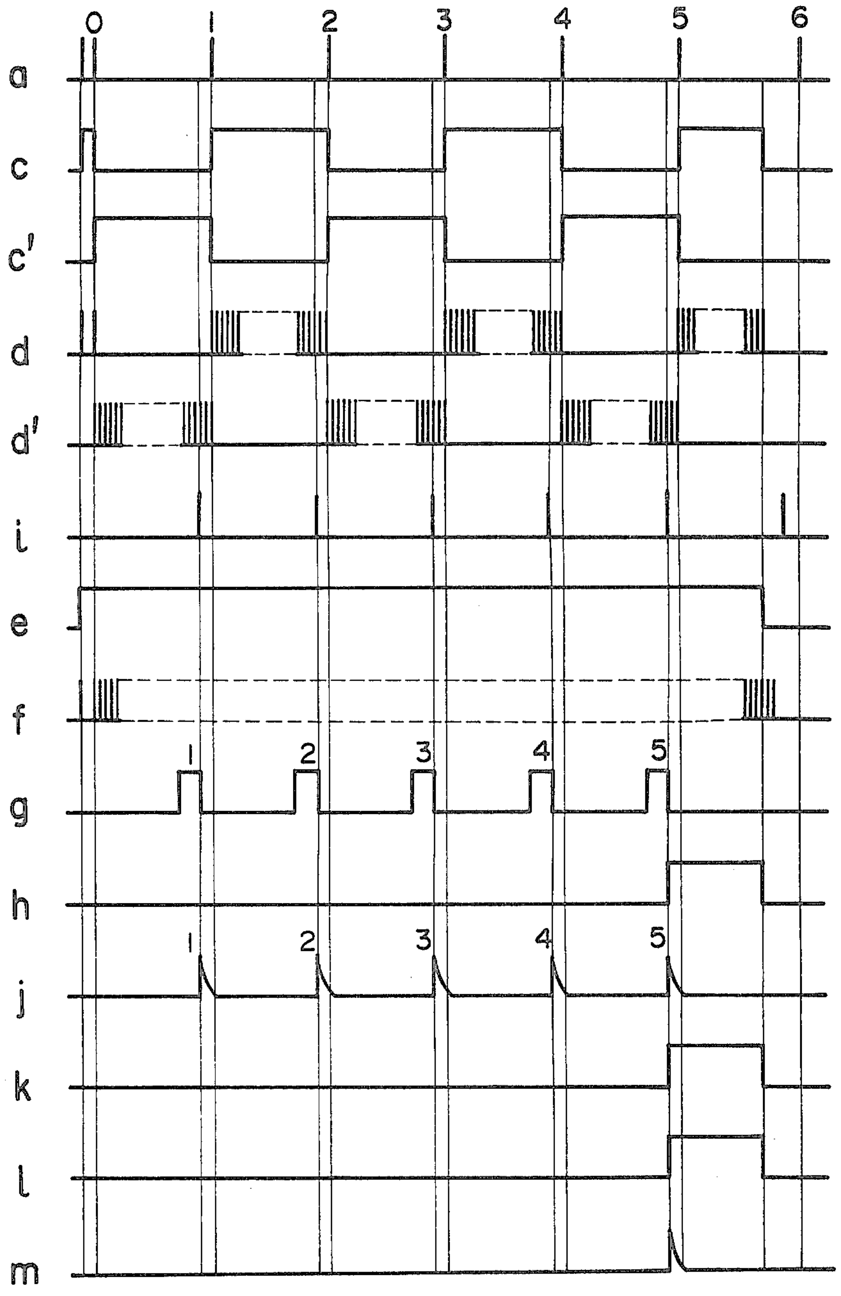

This invention will be more fully understood from a reading of the detailed description of a specific embodiment of this invention, with reference to the accompanying illustrative drawings, wherein:

FIG. 1 is a block diagram showing an embodiment of the standard time signal generator according to the present invention, FIG. 2 is a waveform diagram of the circuit of FIG. 1, wherein Second signals only are received, FIG. 3 is a waveform diagram of the circuit of FIG. 1, wherein noise components of short interval are received, FIG. 4 is a waveform diagram of the circuit of FIG. 1, wherein noise is included between the Second signals, and FIG. 5 is a waveform diagram of the circuit of FIG. 1, wherein noise is present in the very vicinity of a Second signal.

In the drawings, the same reference marks are used in all of the figures to designate common elements.

In the embodiment shown, Second signals from the JJY wave are received, the first of these signals actuating a reference signal generator. Five reference signals are sequentially compared with the Second signals (or apparent Second signals) and when all of them are coincided with each other, or in other words when the first apparent Second signal received is confirmed to be an actual Second signal, an output signal is generated. In this embodiment, a standard time signal is set to be generated for an interval of six seconds.

A receiver 1 is designed to receive the JJY wave and selectively output Second signals modulated at 1600 Hz. For this purpose, the receiver is provided with a filter for selecting the Second signals modulated at 1600 Hz from the rest of the wave. In FIG. *2a*, the output of the receiver 1 is shown as consisting of pulses generated at intervals of one second. The frequency of an oscillator 2 is regulated by a quartz crystal the oscillator generating pulses having a frequency of 100 Hz. A 5.8 second pulse generating timer 6 whose pulse lasts for 5.8 seconds is set at the time of the first output of the receiver 1 (hereinafter referred to as the time 0), and is reset by a reset output R, 5.8 seconds after the pulse is generated, as shown in FIG. *2e*. The output from the timer 6 is supplied to a 5.8 seconds gate 7, which passes through the 100 Hz pulse generated by the oscillator 2 for 5.8 seconds. A reference signal generator 8 counts 80 of the 100 Hz pulses for $80\times10$ ms$=$800 ms, and thereafter generates a pulse which lasts for 200 ms.

After a further 800 ms has passed, it generates another 200 ms pulse. These 200 ms pulses, which occur at intervals of one second, will be referred to as reference pulses. The reference pulse train which is shown in FIG. 2*g*, is generated by oscillator 2 from the time 0 with one second intervals between each pulse. If the output from the receiver 1 at the time 0 is a Second signal from the JJY wave, the reference pulse train corresponds in time to the output of the Second signals from the JJY wave.

On the other hand, an output from the receiver 1 is supplied to a circuit 3 comprising a flip-flop FF3. The FF3 is inverted by an output pulse from the receiver 1 (a Second signal or noise), and supplies gates 4, 4' with complementary outputs c, c', as shown in FIG. 2*c*, and 2*c'* respectively. The 100 Hz pulse train from the oscillator 2 is applied to a 98 counter 5 through the gates 4, 4', as shown in FIGS. 2*d*, and 2*d'*. The 98 counter 5 first counts the output pulses d from the gate 4 and when the number of pulses reaches 98, generates an output pulse indicated by the numeral 1 in FIG. 2*i*. Thereafter the 98 counter 5 counts the output pulses d' for 98 pulses and then generates an output pulse indicated by the numeral 2 in FIG. 2*i*.

In other words, the output of the receiver 1 at the time 0 is replaced with pulse 1 of FIG. 2*i* and the receiver output at the time 1 is replaced with pulse 2 of FIG. 2*i*. Since this replacement occurs only when the count reaches 98, if the FF3 is inverted before 98 pulses have been counted, an output is not generated. In a normal operation, therefore, a first output pulse 1 (FIG. 2*i*) from the 98 counter 5 is generated 980 ms after the first output pulse 0 (FIG. 2*a*) of the receiver 1, and a second pulse 2 (FIG. 2*i*) 980 ms from the time of generation of the next pulse 1 (FIG. 2*a*) output from the receiver 1, normally one second after the first output. Thus, the counter 5 generates pulses corresponding to the Second signals by replacement, as seen in FIG. 2*i*. Outputs from the 98 counter 5 and the reference signal generator 8 are fed into a coincidence gate 9 for comparison of time coincidence therebetween. The gate 9 generates an output when both inputs are coincident with each other, as seen in FIG. 2*j*.

The output from the coincident gate 9 is supplied to a coincident counter 11, which counts the outputs from the gate 9 up to five, and generates the output shown in FIG. 2*k*. However, when the counter 11 is reset before counting to 5 by a reset output R, counter 11 does not generate an output. The reset output R will be explained later.

A 5 counter 10 counts inputs from the reference signal generator 8 and at the time of fall of the fifth reference pulse, generates an output as shown in FIG. 2*h*.

Outputs from the counter 10 and the coincident counter 11 are fed into a 5 coincidence gate 12, whose output as shown in FIG. 2*l* is fed through to a differentiating circuit 13 to produce the pulse shown in FIG. 2*m*.

A reset signal generator 14 forms a reset signal from the outputs of the counter 10 and the reference signal generator 8. The reset signal is generated 5.8 seconds after from the time 0. At the time of rise of a sixth pulse generated by the reference signal generator 8, the reset signal is supplied to the FF3, the 98 counter 5, the 5.8 second pulse generating timer 6, the reference signal generator 8, the 5 counter 10 and the coincident counter 11 so as to reset them in order to keep the entire circuit in a condition to be able to receive the next standard time signal from the JJY wave.

Several examples of operation of the above mentioned standard time signal generator according to the present invention will be explained hereinafter.

The case when Second signals only are received—FIG. 2

A first Second signal from the JJY wave (FIG. 2*a* time 0) and an output c of the FF3 are both at the H-level, while the output c' of the FF3 is at the L-level. In this condition therefore the output b of the oscillator 2 is fed into the 98 counter 5 through the gate 4.

On the other hand, at the time 0, the 5.8 second pulse generating timer 6 supplies an output to the 5.8 second gate 7, so that the output of the oscillator 2 is fed to the reference signal generator 8, as shown in FIG. 2*f*. When 80 output pulses from the oscillator 2 are counted by the reference signal generator 8, a first reference signal is generated therefrom, as shown in FIG. 2*g*. 980 ms after the time 0, the 98 counter 5 generates a first pulse caused by the output from the receiver at the time 0, as shown in FIG. 2*i*. At that time, the reference signal has already been generated, and therefore an output is generated from the coincident gate 9. Thus, the coincident counter 11 counts a first time coincidence.

When the next JJY Second signal is received and an output is generated therefrom at the time 1 in the figure, an output c' is generated from the FF3, as in FIG. 2*c'*. Consequently, the 98 counter 5 receives an output from the oscillator 2 through the gate 4', and starts counting thereof.

On the other hand, although an output is supplied to the 5.8 second pulse generating timer 6 at the time 1, there occurs no changes in the circuit condition of the timer 6. Therefore the reference signal generating operation is continued by the reference signal generating circuit without receiving any input therefrom. When the 98 counter 5 counts the 98th pulse and generates an output 2 as in FIG. 2*i*, since a reference signal is already generated, as shown at 2 in FIG. 2*g*, the coincident gate 9 generates an output and the coincident counter 11 counts a second time coincidence.

Similarly, an output from the receiver 1 at the time 4 (FIG. 2*a*) causes the 98 counter 5 to generate an output corresponding to the output at the time 4, as shown at 5 in FIG. 2*i*, and the coincident gate 9 generates an output as shown at 5 in FIG. 2*j*. The coincident counter 11 therefore counts a fifth time coincidence and generates the output shown in FIG. 2*k*. On the other hand, the 5 counter 10 at the output of the reference signal generating circuit generates an output h as shown in FIG. 2*h* at the time of fall of the fifth reference pulse. Consequently, the gate 12 generates an output, which is differentiated into a standard time signal m. At the same time, necessary components of the circuit are reset by an output from the reset signal generator 14, so that the circuit is returned to the initial condition for the next cycle of operation. Thus, the operation may be repeated in a period of six seconds and the circuit generates a standard time signal once every six seconds.

The case when short interval noise is received —FIG. 3

As mentioned before, it often occurs that noise which might be confused with the modulated Second signals is received. In such case, correct Second signals are mixed with this noise. In a short wave receiver provided with an AGC (automatic gain control) circuit for keeping a specific receiving level, when the noise level is temporarily high, the receiver can only generate outputs corresponding to these noise components. FIG. 3 shows such an example, where noise components of ¼ second intervals are shown for easy understanding. The FF3 is inverted by each of the outputs from the receiver 1 from the time 0, and accordingly outputs c, c' therefrom are inverted each time. The 98 counter 5 cannot count up to 98, and so it does not generate a replaced output pulse, as shown in FIG. 3*i*. On the other hand, because of the output from the oscillator 2, there are generated outputs e, f, g and h, as shown in FIG. 3. However, since an output i is not generated from the 98 counter 5, the coincident gate 9 does not generate an output, as shown in FIG. 3*j*. Thus, there is no output from the coincident counter 11, and a standard time signal is not supplied from the differentiating circuit 13.

The case when noise is mixed between the Second signals—FIG. 4

FIG. 4 shows a case when noise is mixed between the times 1 and 2. The noise input inverts the FF3 and therefore no pulses are generated corresponding to the second Second signal at the time 1 and to the noise signal. Although the gate 9 generates outputs for the other Second signals, when the fifth reference pulse 5, FIG. 4*g*, is generated, the coincident counter 11 has counted only 4 time coincidences, and does not generate an output at the time of the output h. A standard time signal is not generated accordingly. With this construction, the erroneous generation of a standard time signal may be avoided even when many noise components are received.

The case wherein noise is received in close proximity to the time 0—FIG. 5

FIG. 5 is a diagram showing an example when noise is mixed within 20 ms before the time 0. This noise pulse actuates the circuit, and the 5.8 second pulse generating timer 6 generates an earlier signal accordingly in advance of the correct timing. Therefore outputs f, g, h, l are also generated earlier than in normal operation.

On the other hand, the FF3 is also actuated by the noise pulse. But, since the first Second signal is supplied early, no output is generated by the 98 counter 5 for the noise pulse although normal outputs for the Second signals from the time 0 are generated, as shown in FIG. 5*i*.

The reference signals are advanced by 20 ms with respect to the time 0. However, since the pulses i and g in FIG. 5 have time coincidence with each other, the coincident gate 9 generates coincident signals 1, 2, 3, 4 and 5. Consequently, the coincident counter 11 counts 5 and generates the output shown in FIGS. 5*k* and 5*l*. Thus a standard time signal m is obtained. The signal m is advanced by 20 ms compared with the normal case. If the advance exceeds 20 ms, the coincident gate 9 does not generate an output, and therefore a standard time signal is not generated.

When a Second signal is not received at the time of 0, or instead, when a noise signal is generated therefor, a similar error occurs.

The standard time signal generator according to the present invention has an error within 20 ms. In view of the fact that the clock pulse is one second, this 20 ms error may be ignored. If necessary, however, this error may be decreased, as will be explained later.

As fully described above, in the standard time signal generator of this invention a standard time pulse is generated by receiving a standard time signal and by confirming it to be the actual standard time signal. As has been explained, the Second signals are replaced according to a specific method and comparison is made between the replaced signals and the reference signals. Thus, an erroneous output is completely avoided.

Variations and modifications can be effected within the spirit and scope of the invention. For example, by raising the frequency of the oscillator 2, or by making the period of selection and replacement closer to one second, the 20 ms error may be decreased.

Also, by increasing the number of time coincidences required the precision may be improved. In case such excellent precision is not required, the number of coincidences may be decreased.

The period of the Second signal selection and replacement may be set closer to two cycles or three cycles.

The output signal m of the standard time signal generator of this invention may be in the form of a pulse train similar to the reference signal instead of a single pulse. In such case, the output pulse train may be used as a secondary standard for the JJY wave.

The standard time signal generator of this invention may be included in a clock provided with a quartz oscillator. In such case, the quartz oscillator circuit of the clock may be used for the oscillator 2 of the standard time signal generator of this invention.

The circuit output of the apparatus of this invention may be utilized to correct errors in a clock which exceed one second. In order to do this, the phase difference between the output pulse and a pulse of the clock must be used for correction.

What is claimed is:

1. A standard time signal generator for receiving an input signal including a train of pulses having the same predetermined interval between each pulse and which may also include noise pulses, said standard time signal generator selectively generating a standard time signal in response to said input signal, comprising:

a receiver tuned to the carrier frequency of said input signal and generating a receiver output signal corresponding to said input signal;

a reference time pulse generator for generating a reference pulse train having an interval between each pulse equal to said predetermined interval, the first pulse in said reference pulse train being generated at a predetermined time after the first pulse in said input signal;

a replaced pulse generator for generating a replacement pulse train having an interval between successive pulses equal to said predetermined interval only when the pulses in said input signal are spaced by said predetermined interval, the interval between at least two pulses in said replacement pulse train exceeding said predetermined interval when significant noise pulses are present in said input signal;

a coincidence counter for generating a coincidence pulse when the pulses in said reference pulse train and in said replacement pulse train have coincided for a predetermined number of times, and an output pulse generator for generating said standard time signal when said coincidence pulse is generated within a predetermined time interval after the first pulse of said input signal, said standard time signal being generated only when no significant noise pulses are present in said input signal.

2. A standard time signal generator according to claim 1, wherein said input signal is modulated and said receiver includes a band-pass filter for selecting said modulated signal to produce a modulated time signal pulse train at the output of said receiver.

3. A standard time signal generator according to claim 1, wherein said reference time pulse generator includes a quartz crystal controlled oscillator.

4. A standard time signal generator according to claim 3, wherein said reference time pulse generator further includes a timer having its input coupled to the output of said receiver, a first gate having inputs coupled to said oscillator and said timer, and a reference signal generator having its input coupled to the output of said first gate, the output of said reference signal generator being said reference pulse train.

5. A standard time signal generator according to claim 3, wherein said replaced pulse generator comprises a flip-flop coupled to the output of said receiver, gate means having its input coupled to the output of said flip-flop and the output of said oscillator, and a first counter having its input connected to the output of said gate means, the output of said counter being said replacement pulse train.

6. A standard time signal generator according to claim 3, wherein said reference time pulse generator further includes a timer having its input coupled to the output of said receiver, a first gate having inputs coupled to said oscillator and said timer, and a reference signal generator having its input coupled to the output of said first gate, the output of said reference signal generator being said reference pulse train; and wherein said replaced pulse generator comprises a flip-flop coupled to the output of said receiver, gate means having its input coupled to the outputs of said flip-flop and the output of said oscillator, and a first counter having its input connected to the output of said gate means, the output of said counter being said replacement pulse train.

7. A standard time signal generator according to claim 6, which further comprises a second counter having its input coupled to the output of said reference signal generator and its output coupled to the input of said output pulse generator, and a reset signal generator having an input connected to the outputs of said reference signal generator and said second counter, said reset signal generator generating a reset pulse for resetting said timer, flip-flop, reference signal generator, first and second counters and said coincidence counter.

8. A standard time signal generator according to claim 1, wherein said output pulse generator generates said standard time signal after said coincidence counter counts five pulses within 5.8 seconds.

* * * * *